Patented June 5, 1945

2,377,491

UNITED STATES PATENT OFFICE 2,377,491

WATERPROOFED LIGHTWEIGHT MATERIALS AND THEIR MANUFACTURE

Hobert R. Goodrich, Glendale, and Glenn Sucetti, Huntington Park, Calif., assignors to Universal Zonolite Insulation Co., Chicago, Ill., a corporation of Montana No Drawing. Application April 20, 1940, Serial No. 330,774

8 Claims. (Cl. 106—96)

The present invention relates to various porous lightweight materials treated and stabilized against the effects of moisture and water and it concerns also their methods of production.

Certain types of waterproof bonding materials, such as emulsified asphalts, or "cut-back" asphalts, have previously been used as a combination bond and waterproofing medium in the treatment of light-weight aggregates, but such bonding media have been found to be deficient in strength and also lacking in fireproofing qualities.

Stronger types of bonds, such as Portland cements, gypsum-plaster, magnesium-oxychloride cements, etc. have been inadequate in water-repellent properties when employed as bonds for the specified type of aggregates and, in fact, they have often been actually hydrophilic in character.

Certain plasticizing agents, such as clay or bentonites, when used by themselves, or when employed in conjunction with these several kinds of bonds, have possessed insufficient permanency of structure due to their being readily slaked by water.

United States Patent 1,927,102, granted September 19, 1933, to Glenn Sucetti and Roland M. Kohr for Insulating and other structure comprising vermiculite, presents a composition of expanded-vermiculite with a clay or bentonite binder for use as a plastic heat-insulating material, the latter having found wide-spread use in industrial fields, and one of the objects of the present invention is to stabilize and waterproof such composition in order to make it resistant to the effects of atmospheric and incidental moisture and water.

Another purpose of the instant invention is to stabilize and waterproof the several heat-insulating and other construction materials formed from mixtures of Portland cement and expanded-vermiculite.

An added aim of the invention is to waterproof in similar manner various other combinations of light-weight aggregates, such as expanded-vermiculite, rock and glass wool, pumice, and Hadite (a light-weight aggregate formed by the calcining of iron bearing clay pellets under reducing firing conditions) when used in conjunction with the several types of binders and plasticizers, such as Portland cements, gypsum, limes, clays and bentonites.

One of the most successful uses found for this novel waterproofing treatment has been in the construction of roofs formed with mixtures of expanded-vermiculite and Portland cement.

The waterproofing-material may be of any one or more of several kinds, but all, more or less, of a general sort termed emulsified asphalts, and of this group a type which is known as a stabilizer is preferred, because it has extremely high covering and protective properties.

For example, it has been established that one of these recently improved products has the capacity for forming a uniform film of 17,000 square feet in area for each cubic inch of material used, such property being extremely important in the waterproofing of light-weight aggregates, such as those mentioned above, due to the tremendous surface area involved, and it has also been of great importance in the waterproofing of highly colloidal materials, such as clays and bentonites, which are ordinarily very easily affected by water or moisture penetration.

Prior to the development of the use of this waterproofing treatment, it was found to be inadvisable to utilize the teachings of Patent 1,927,102 for the forming of articles such as pipe-covering and insulating-blocks due to the lack of stability in the presence of moisture. This drawback has now been removed and it is possible to form such articles without fear of them disintegrating in service.

One successful use of the waterproofing procedure has been made by blending the following materials together to form a waterproof lightweight concrete:

| | Pounds |
|---|---|
| Portland cement | 94 |
| Expanded-vermiculite | 29 |
| Waterproofing-stabilizer | 8 |
| Water | 124 | the stabilizer being added as a water-dispersed emulsified waterproofing-agent weighing approximately 8.45 pounds per gallon.

One such waterproofing-stabilizer comprises an aqueous, bituminous or asphalt, emulsion incorporating bitumen, water, and fatty-acid to the extent of about 2½% to 5% by weight of the bitumen in the form of an alkali-soap, such stabilizer comprising an intimate admixture which is a readily pourable liquid when cold, the indicated waterproofing-stabilizer being capable of production by melting the bitumen, such as asphalt from Mexico or California, and adding thereto with agitation first an amount of higher fatty-acid, such as an unsaturated fatty-acid, preferably oleic acid, approximately 2½% to 5% by weight of the bitumen, and then gradually a dilute (1%-2%) caustic-soda solution at about 215°-225° F. equivalent to 0.5% of NaOH by weight reckoned on the asphalt, the amount of water being sufficient to introduce 25 to 50 parts per 100 of the asphalt, the total quantity of NaOH being about ⅛ part of the oleic acid, the heating and agitation being continued until emulsification results. Instead of using caustic-soda, caustic-potash or sodium or potassium carbonate in equivalent value may be employed.

Another suitable waterproofing-stabilizer may be made so as to produce a stable liquid emulsion by melting Mexican asphalt or its equivalent, which is solid at normal temperature, then pouring it into a dilute aqueous caustic-alkali solution at a temperature in the neighborhood of 215° F. and stirring the mixture to effect the reaction between the alkali and one of the ingredients of the asphalt, or, stated differently, the procedure may be followed by providing such second stabilizer by mixing directly, while stirring, melted asphalt containing in its natural state a saponifiable material, solid at normal temperature, and dilute aqueous caustic-alkaline solution at a temperature of about 215° F. to produce the required reaction between the alkali and the saponifiable ingredient of the asphalt. A suitable recipe comprises 800 parts by weight of Mexican asphalt, 4 parts of caustic-potash, and 560 parts of water in which the caustic-potash has been dissolved, the temperature of the mixture being maintained at about 100° C. until the emulsification has been completed.

When preparing the Portland cement, expanded-vermiculite, waterproofing-stabilizer and water referred to above, it has been found to be satisfactory to use a line-type concrete-mixer and to mix first the Portland cement and water to which is then added the stabilizer and finally the expanded-vermiculite. After pouring this into forms and tamping it into place in the usual method of handling concrete, it was found that after drying this mixture and allowing the cement to set, the resultant light-weight concrete was very repellent to water penetration.

For example, small cylinders of this mixture were floated on water for twenty-four hours and compared in their water absorptive properties with similar cylinders prepared without the stabilizer, and it was discovered that the latter cylinders would absorb about 148% of their own weight in this period of time, whereas the waterproofed cylinders would only absorb approximately 35% of their own weight. While these absorption values appear to be relatively high, it will, of course, be apparent that this is due to the lightness of the materials involved and to their low bulk specific-gravity, and actually the percentage of the total volume that was filled in by the water in floating on the water bath amounted to 19.6% in the case of the stabilized or waterproofed cylinders.

It has been discovered that the effectivness of the waterproofing is determined in the initial stages by the amount of waterproofing-agent added, and that a point is finally reached, where further increases in waterproofing have little effectiveness; for example, 5% of waterproofing-medium reduced the absorption from 148% down to 39%, and an additional 5% lessened it to 30%, but beyond this point, there was a further decrease in effectiveness.

Another successful employment of this treatment has been made in conjunction with the composition mentioned in United States Patent 1,927,102 referred to above in which bentonite is used as a plasticizer and binder, this unwaterproofed, patented product having been used as a heat-insulating means and capable of being mixed on the job by the addition of water to the premixed dry composition. Having great plasticity, it has been applied directly to either hot or cold metal surfaces, such as over hot-air ducts, heating-furnaces, oil-stills, etc., but prior to the development of the employment of this novel waterproofing treatment, it was not always advisable to utilize the teachings of such patent for the forming of articles such as pipe-covering, and insulation-blocks, due to the lack of adequate stability in the presence of moisture, this drawback having now been removed, however, and it is at present possible to form such articles without fear of their disintegration in service.

This unwaterproofed material of the patent mentioned loses strength and bond when subjected to severe moisture conditions but by the addition of as little as 5% by weight of the liquid waterproofing-agent at the time of mixing, the resulting product may be immersed in water for long periods of time without slaking or otherwise disintegrating.

For this purpose, it has been demonstrated that a mixture of the following elements in the proportions by weight stated produce a satisfactory product:

| | Pounds |
|---|---|
| Vermiculite (expanded) | 75 |
| Bentonite | 15 |
| Asbestos | 10 |
| Waterproofing-stabilizer | 8 |
| Water | 260 |

The waterproofing instrumentalities herein referred to have distinct advantages as to cost, permanence, and ultimate insulating efficiency of the ensuing product as compared to previous practices, and such stabilizers are preferably, but not necessarily, made from asphalt obtained from certain oil fields, such as those of Mexico and California, since eastern asphalts seemingly do not give as favorable results.

The outstanding beneficial effects are obtained by reason of the use of the caustic treatment, such as sodium-hydroxide, which apparently leaves no substantial impurities in the final product, such as are experienced when clay is employed for emulsification.

Ordinary asphalt emulsions used as a waterproofing-substance do not have the following desirable characteristics possessed by those mentioned herein:

(a) The damp-proofing agent as used contains not over ½% to 1% sodium-hydroxide;

(b) By charging the emulsion with a negative charge, the presence of additional water causes dispersion to continue to a point of infinitesimal fineness whereby a cubic-inch of the material will form a complete film over a considerable area even as high as 17,000 square feet;

(c) After the filmed particles, which have been coated with the damp-proofing agent, have dehydrated, they can be boiled for twenty-four (24) hours without breaking the film;

(d) The product is especially designed for hydrophilic aggregates, such as expanded-vermiculite, as the penetration of aggregates is reduced to a minimum due to the fact that the waterproofing-means seeks water and will not penetrate a dry porous surface;

(e) After dehydration of the very thin surfaces of the vermiculite-granules, there is no re-emulsification in the presence of water, this being definitely not true with other types of emulsion known, re-emulsification, for example in the case of cold-storage blocks, proving very destructive, which detrimental effect is eliminated by the newly-perfected damp-proofing medium.

By the employment of this novel damp-proofed plastic, it is possible to produce a very satisfactory pipe-covering for either high-temperature or cold-storage work as well as in the form of blocks.

The amount of waterproofing-element to be added is usually preferably between 4% and 8% by weight of the total dry materials, the specific amount varying according to the character of the materials and the amount of fines and colloidal material present, and, of course, the use to which the product is to be put will further serve to determine the proper amount to be used.

In this connection the economics of the situation are to be taken into consideration in that the use of the waterproofing increases the cost of the finished material, and, inasmuch as the waterproofing effect is augmented by an increase in the amount of waterproofing-medium used, there are certain cases where an excess would be desirable, such as in cold-storage insulation work. For this use, as much as 15% to 20% of the total weight might be desirable, whereas, in other instances, such as in the insulation of the interior of furnaces or of steam-lines, as little as 1% might be economically practical, but, it is, however, doubtful whether less than 3% to 4% would be employed to any great extent.

In some cases, in insulating-plastic, an amount of waterproofing material equal to 37.5% of bentonite content by weight has been used and experience indicates that it may be desirable to employ 100% for severe conditions such as in cold-storage work.

For less colloidal binders, such as Portland cement and gypsum, it has been found that amounts of 7% to 14% by weight of the material finer than 200 mesh is sufficient for good waterproofing qualities.

The term "stabilizer" as herein employed is intended to indicate that by its use the clays and bentonites are rendered incapable of becoming affected or changed by conditions of service such as by water which would slake down the usual untreated clays or bentonites. The same effect is obtained on binders other than clay, such as gypsum-plaster, magnesium-oxychloride or oxy-sulphate cements, sodium-silicate, etc.

While the stabilizing effect in connection with moisture and water are of primary interest, it is also true that the material so treated will additionally become more resistant to acids and alkalies.

The bituminous emulsions referred to, as susceptible of beneficial employment, differ from the usual clay and other similar emulsified asphalts in the tremendous surface area that they are capable of coating, and the asphalt in these emulsions is present in spherical particles of microscopic size which make the emulsions particularly effective for the purpose indicated.

Furthermore, most asphalt-emulsions are used as binders whereas the particular emulsions referred to are not employed as binders but rather as a waterproofing and stabilizing agent in combination with a filler and a binder which may also be a plasticizer.

So far as is known, the present invention represents the first use of this type of material as a waterproofing and stabilizing ingredient for mixtures of such porous light-weight aggregates with binders such as Portland cement; and for porous, light-weight aggregates plasticized with clay or bentonite and used to form articles such as pipe-covering and insulating-blocks and tiles.

Those acquainted with this art will appreciate that this invention as defined by the appended claims is not necessarily limited to the details set forth above and that reasonable modifications thereof may be resorted to without departure from the fundamental principles of the invention.

We claim:

1. In the method of making an unbaked water-resistant light-weight composition including mixing at ordinary atmospheric temperature a light-weight aggregate weighing between 4 pounds and 50 pounds per cubic-foot, a binder performing practically all of the bonding function in the resulting product, and sufficient water for workability, the novel improvement of including in the mixture an emulsified water-dispersed waterproofing-bitumen stabilizer also at ordinary atmospheric temperature and having substantially no bonding property in the resulting product and used in the amount of between 2 per cent and 10 per cent of the weight of the dry ingredients of the mixture to render the product water-repellent.

2. The novel improvement set forth in claim 1 in which the mixture in which the stabilizer is employed has expanded-vermiculite at least in major degree as the aggregate and Portland cement as the binder.

3. The novel improvement set forth in claim 1 in which the mixture ingredients, with which the stabilizer is employed, have the approximate proportion of 29 pounds of expanded-vermiculite as the light-weight aggregate, 94 pounds of Portland cement as the binder, and 124 pounds of water, the stabilizer employed being approximately 8 pounds.

4. The novel improvement set forth in claim 1 in which the mixture ingredients, in which the stabilizer is employed, have the approximate proportion of 29 pounds of expanded-vermiculite as the light-weight aggregate, 94 pounds of Portland cement as the binder, and 124 pounds of water, the stabilizer used being approximately 8 pounds, the cement and water being first mixed, then the stabilizer added, and then the expanded-vermiculite added.

5. The novel improvement set forth in claim 1 in which the mixture ingredients, with which the stabilizer is employed, have the approximate proportion of 75 pounds of expanded-vermiculite as the aggregate, 15 pounds of bentonite as the binder, 260 pounds of water, the stabilizer being approximately 8 pounds, such mixture also including about 10 pounds of asbestos.

6. A light-weight composition, having exfoliated-vermiculite particles as the aggregate at least in major degree and Portland cement as practically the sole binder, incorporating the novel improvement that the composition, including both the aggregate and the binder is rendered water-resistant by a waterproofing medium having substantially no aggregate bonding properties in the relation employed.

7. A light-weight composition, having a light-weight aggregate at least in major degree of between 4 pounds and 50 pounds per cubic-foot bound together practically solely by a binder, incorporating the novel improvement that the composition, including both the aggregate and the binder, is rendered water-repellent by a waterproofing agent having substantially no aggregate bonding properties in the relation employed.

8. A light-weight composition having waterproofed exfoliated-vermiculite and a binder for said vermiculite, the novel improvement being (a) that said binder is other than the waterproofing agent of said vermiculite, and (b) that said binder is waterproofed by said agent.

HOBERT R. GOODRICH.
GLENN SUCETTI.